United States Patent [19]
Fedeli et al.

[11] Patent Number: 5,440,530
[45] Date of Patent: Aug. 8, 1995

[54] INTEGRATED MAGNETO-OPTICAL HAVING A MAGNETIC HEAD SET BACK FROM AN OPTICAL HEAD

[75] Inventors: Jean-Marc Fedeli, Beaucroissant; Hubert Jouve, Biviers; Stéphane Renard, Chanp-Sur-Drac; Serge Valette, Grenoble, all of France

[73] Assignee: Commissariat a l'Energie Atomique, Paris, France

[21] Appl. No.: 207,207

[22] Filed: Mar. 8, 1994

Related U.S. Application Data

[62] Division of Ser. No. 879,840, May 6, 1992, Pat. No. 5,317,800.

[30] Foreign Application Priority Data

May 7, 1991 [FR] France .................................. 91 05622

[51] Int. Cl.[6] ............................................ G11B 11/00
[52] U.S. Cl. ...................... 369/13; 369/44.39; 360/59; 360/114
[58] Field of Search .................. 369/13, 44.11, 44.14, 369/44.23, 44.26, 44.28, 44.39, 275.3, 283, 110; 360/59, 114; 365/122, 124; 29/603

[56] References Cited

U.S. PATENT DOCUMENTS

| | | | |
|---|---|---|---|
| 4,796,226 | 1/1989 | Valette | 365/122 |
| 5,022,018 | 6/1991 | Vogelgesang | 369/13 |
| 5,124,961 | 6/1992 | Yamaguchi et al. | 369/13 |
| 5,317,800 | 6/1994 | Fedeli et al. | 360/114 X |

FOREIGN PATENT DOCUMENTS

0492888  7/1992  European Pat. Off. .

Primary Examiner—Ali Neyzari
Attorney, Agent, or Firm—Oblon, Spivak, McClelland, Maier, & Neustadt

[57] ABSTRACT

An integrated magneto-optical read and write head having a magnetic head set back from an optical head. The integrated magneto-optical head includes an optical subassembly having optical input for receiving optical radiation and an optical output positioned in an output plane. A magnetic subassembly includes a magnetic circuit having at least one polar part PPI placed in a plane perpendicular to the output plane, the polar part PPI exhibition a magnetic pole toward a recording medium. The magnetic pole is set back relative to the output plane of the optical output to reduce the difference between the magnetic coercive field below the optical output and the magnetic pole such that a larger range of magneto-optical materials may be employed in magneto-optical heads.

4 Claims, 8 Drawing Sheets

INTEGRATED MAGNETO-OPTICAL HAVING A MAGNETIC HEAD SET BACK FROM AN OPTICAL HEAD

This is a division of application Ser. No. 07/879,840, filed on May 6, 1992, now U.S. Pat. No. 5,317,800.

BACKGROUND OF THE INVENTION

FIELD OF THE INVENTION

This invention has as its object an integrated magneto-optical read and write head and a process for producing such a head.

Magneto-optical devices generally comprise three essential components, namely a recording medium, an optical head and a magnetic head;

The recording medium, of a magneto-optical material, is capable of setting, in the form of magnetic domains, binary data corresponding to the orientation of the magnetization of the material, either to the right or to the left (for so-called parallel recording), or up or down (for perpendicular recording). The domains are of small size (about 1 square micron).

These domains are able to be oriented in the same direction as an outside magnetic field if the latter is greater than a specific, critical field of the material, known as the coercive field and designated Hc.

This coercive field represents, as it were, the repatance to the orientation variation of the domains under the effect of an outside field.

For a domain oriented in a direction arbitrarily considered as positive, an outside field can switch this domain to a negative orientation only if this field takes a lower negative value $-Hc$.

To reorient the domain in the positive direction, the outside magnetic field will have to increase to take a positive value greater than $+Hc$.

A second property of a magneto-optical material is that its coercive field decreases when the temperature rises from the ambient temperature (20° C.) to a value between, for example, 100° C. and 300° C.

This reduction of the coercive field with temperature makes it possible to control the switching of the magnetization. For this purpose, an outside magnetic field is applied having a direction that is opposite the initial orientation of the medium and having a value greater than the coercive field when hot but less than the coercive field at the ambient temperature. A laser beam is focused on the zone to be treated to heat the material locally.

A third essential property for a magneto-optical material is to cause a good optical detection signal. This detection signal is generally due to an angular rotation of the polarization plane of the light wave during its reflection on the material. The value and the sign of this rotation are different in the direction of the orientation of the magnetization which will be shown by a "1" or a "0".

This rotation can occur at the interface of the magometo-optical material with air (KERR effect) or while passing through the material (FARADAY effect).

In the case of a transparent material deposited on a reflector, the signal is a response to the two KERR and FARADAY effects combined.

The detected magneto-optical signal is proportional to the angle of rotation of the polarization plane in the reflection on the material.

The optical head performs two functions, one of writing, the other of reading:

In writing it must focus the light radiation coming from a light source (laser diode, for example) on a surface that the smallest possible area to heat a zone of the medium and only this zone to cause a switching of the magnetization under an outside magnetic field:

In reading it must analyze the beam reflected by the medium and show the rotation of the polarization plane of an electric signal variation, with photodetectors, for example.

A magnetic head is necessary, in writing, to apply a switching field to the material. The value of the field will have to be sufficient but remain less than the coercive field of the material at the ambient temperature, so as not to erase or degrade the existing recordings on the adjacent tracks.

The direction of the magnetic field is the direction that it is desired to impart to the domains during the writing.

DESCRIPTION OF RELATED ART

These three components (recording medium, optical lead, magnetic head) can be assembled in various ways. In particular, the optical head can be produced in an integrated way as described, for example, in French patent document FR-A-2 606 921 (or its U.S. corresponding document US A-4 796 226).

Figure 1:
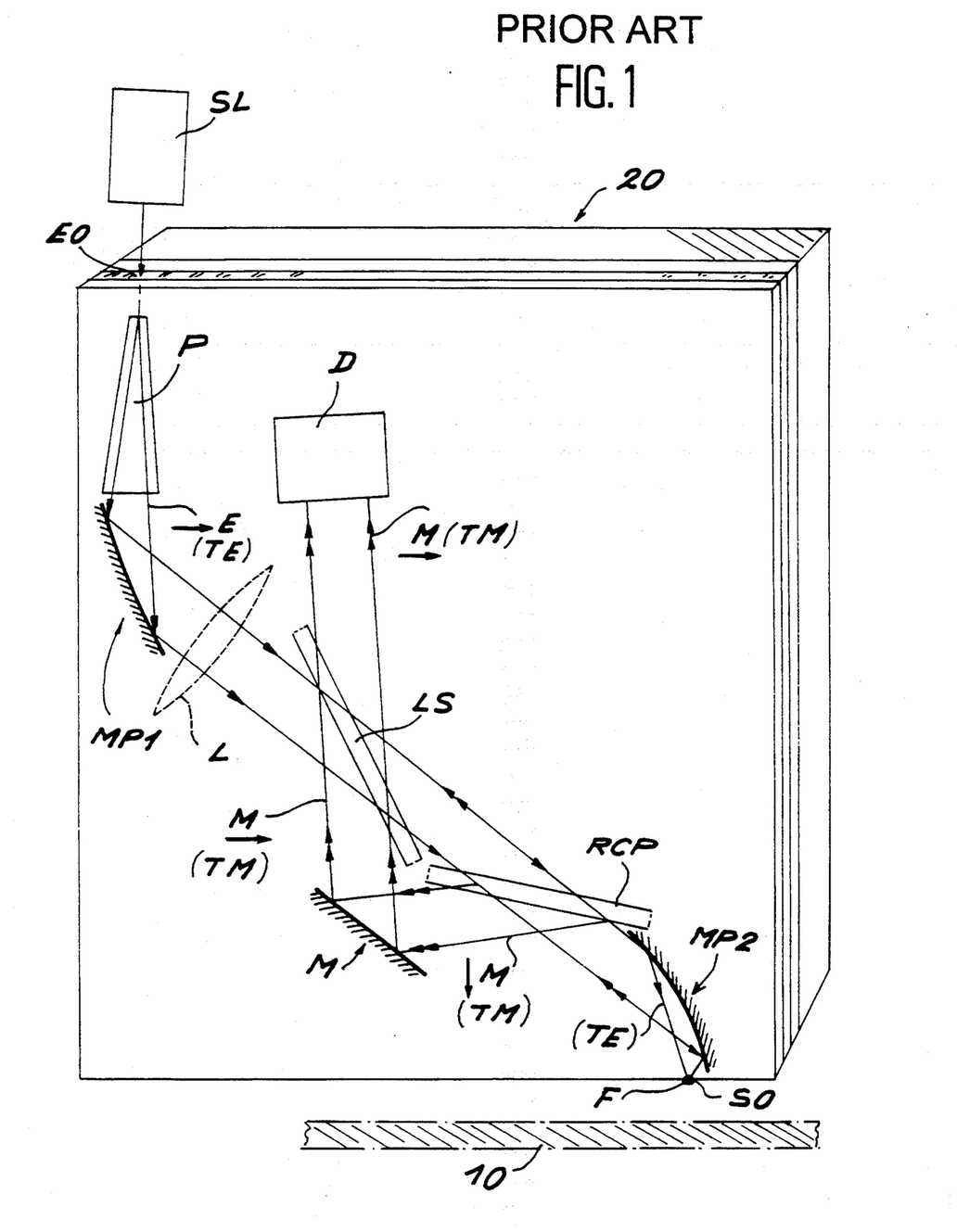
FIG. 1, already described, shows a known optical subassembly.

Attached FIG. 1 recalls the essential part of the structure of such a component.

The device represented in this figure comprises a light source SL and a guide structure 20 comprising an optical input EO, a polarizer P, a collimation optical system consisting of a cylindrical mirror with paraboid section MP1, a cylindrical mirror with parabolic section MPZ, an optical output SO where mirror MP2 focuses the light that it receives, a polarization converter network RCP, a mirror M placed on the path of the beam diffracted by network RCP, a semitransparent plate LS, recombining the beam what it reflects partially with the beam coming from mirror M and a photodetector D.

The operation of this device is fully described in document FR-A-2 606 991 (US-A-4 796 226).

In operation, this structure is glued vertically at the back of a flying pad which keeps the plane of the optical output at a distance from the recording medium (on the order of a micrometer or slightly less).

So that such a component can also function in writing, it is necessary to associate a magnetic head with it that is able to create a magnetic field greater than the coercive field of the medium in the lighted zone at the temperature reached in this zone, but less than the coercive field of the medium in the nonilluminated zones which are at ambient temperature.

Document EP-A-0 338 864 describes an integrated read and write head which comprises both an optical subassembly (which, moreover, is not of the type previously described but which uses microguides comparable to optical fibers) and a magnetic subassembly, the whole integrated on the same substrate FIG. 18 of this document, in particular, shows a general view of the magneto-optical head and FIG. 19 represents a section of the optical circuit-magnetic circuit stack. There are optical guides (244 and 245) and a magnetic circuit integrated in thin layers, with a lower polar part (252), an electric coil (254) and an upper polar part (257). The described circuit is a gap circuit referenced g.

The production of such a head is such that the output of the optical guide and the end of the polar parts are in the same plane (reference 81). This plane is obtained by polishing the stack after cutting.

The magnetic poles and optical output are therefore offset longitudinally (i.e., in the direction of relative displacement of the head and of the medium or, if it is desired, in the direction of the recorded track). It results from this longitudinal offset that the field does not have the same value opposite the poles as opposite the optical output.

Figure 2:
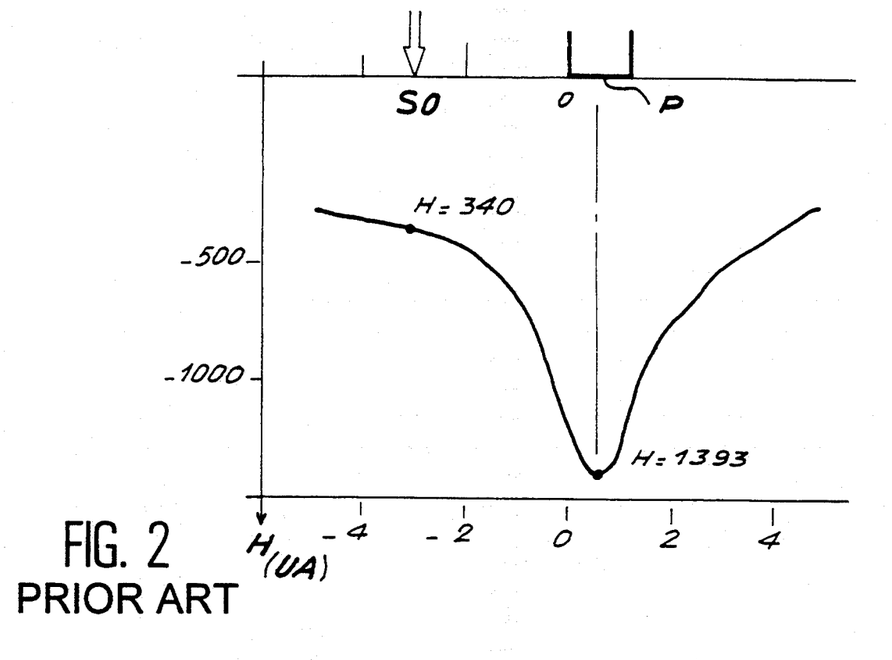
FIG. 2, already described, snows the variation of the magnetic field along a magneto-optical head of the prior art.

Accompanying FIG. 2 illustrated this phenomenon. In this figure, the variation of the magnetic field (plotted on the ordinated and measured in arbitrary units UA) created by a pole P is seen as a function of the distance plotted on the abscissas and counted in micrometers starting from the edge of the pole. In the illustrated case, optical output SO is 3 $\mu$m from pole P, the distance between the output plane of the head and the medium being 0.5 $\mu$m.

It is seen that the magnetic field has a value of 1393 UA perpendicular to pole P while this value drops to 340 UA perpendicular to the optical output, or a ratio R close to 4.

This phenomenon requires that the magneto-optical material used exhibit, in addition to the usual properties characteristic of this type of application, a very great variation of the coercive field as a function of temperature, since this coercive field must be less than 340 UA at the temperature reached facing the optical output, while being greater than 1393 UA at the ambient temperature. This constraint considerably limits the choice of magneto-optical materials able to operate in reading and in writing.

SUMMARY OF THE INVENTION

This invention has precisely at its object to eliminate this drawback. For this purpose, it proposes a write and read head for which ratio R between the field perpendicular to the pole and the field perpendicular to the optical output is smaller than in the prior art which reduces the constraint mentioned above while assuring a more intense field opposite the optical output.

This result is obtained by modifying the structure of the magnetic write subassembly so that the pole is no longer flush with the optical output plane, but is slightly set back relative to this plane. This offset can be described as crosswise to the extent that it takes place in the direction perpendicular to the output plane, in contrast to the known longitudinal offset which exists and which takes place parallel to this plane.

The optimal value of the setting back depends on the nature of the magneto-optical material.

If the material exhibits a great difference of coercive field between the ambient temperature and the temperature obtained by optical heating, ratio R is not very important and the distance separating the pole of the output plane from the optical subassembly will be adjusted so that the magnetic field is maximum opposite the optical output. A minimum excitation current thus will be obtained to switch the magnetization of the domains.

In the opposite case, the difference between the pole and the optical output plane will have to be sufficient so that ratio R of the fields quite low and in any case legs than the ratio of the coercive fields at ambient temperature (under the pole) and at write temperature (under the optical output).

Purely by way of explanation, and since it will be better understood below, it will be possible to take as crosswise offset about 1.5 to 1.8 $\mu$m and, for example, 1.7 $\mu$m in the first case and about 2.5 to 3 $\mu$m and, for example, 2.7 $\mu$m in the second.

Specifically, the invention has as its object an integrated magneto-optical read and write head on a magnetic recording medium, this head comprising two integrated subassemblies juxtaposed and integrated on the same substrate, namely:

a first optical subassembly comprising an optical input able to receive an optical radiation, an optical output placed in an output plane, first optical guide means between the input and the output, a photodetector, second optical guide means between the output and the photodetector, a second magnetic subassembly, comprising a magnetic circuit with at least one polar part placed in a plane perpendicular to the output plane, this polar part exhibiting a magnetic pole turned toward the recording medium, an electrically conductive coil surrounding said magnetic circuit, this head being characterized by the fact that the magnetic pole is set back relative to the optical output plane, the optical output of the first subassembly and the magnetic pole of the second subassembly exhibiting a crosswise offset.

In any case, the characteristics and advantages of the invention will come out better in light of the following description. This description relates to examples of embodiments given by way of explanation and that are in no way limiting and it refers to the attached drawings in which:

DESCRIPTION OF THE PREFERRED EMBODIMENTS

Figure 3:
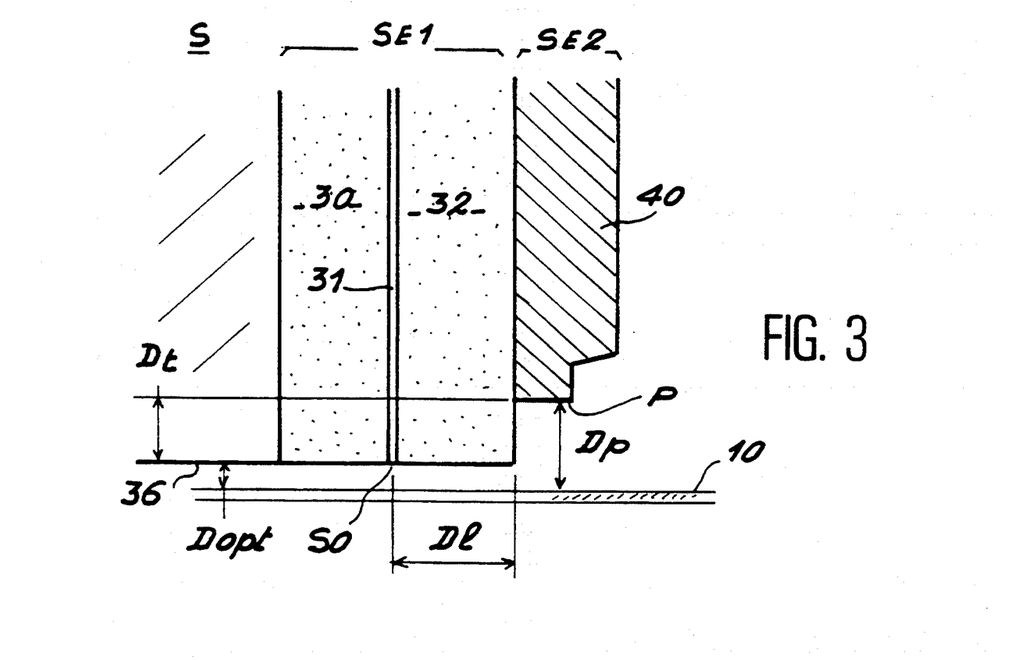
FIG. 3 shows diagrammatically and in crosswise section the essential part of a head according to the invention.

In FIG. 3, in very diagrammatic section, a first subassembly SE1 optical in nature and a second subassembly SE2 magnetic in nature juxtaposed and both integrated in a substrate S are seen.

Optical subassembly SS1 essentially comprises an optical guide 31 (for example, of $Si_3N_4$) interposed between two layers 30, 32 (for example of $SiO_2$) with index of refraction less than that of guide 31. Layers 30, 31, 32 are furthermore transparent in the wavelengths used. Substrate S can be of silicon. This optical subassembly exhibits an optical output SO which is flush with output plane 36. The distance between this plane and recording medium 10 is designated Dopt.

Second subassembly SE2 comprises a magnetic circuit 40 ending with a pole P turned toward recording medium 10. The distance between this pole P and the medium is designated Dp. A longitudinal difference D1 separates optical output SO from the edge of pole P.

According to the invention, this pole is set back relative to output plane 36. The crosswise difference between the pole and this plane is designated Dt.

Figure 4A:
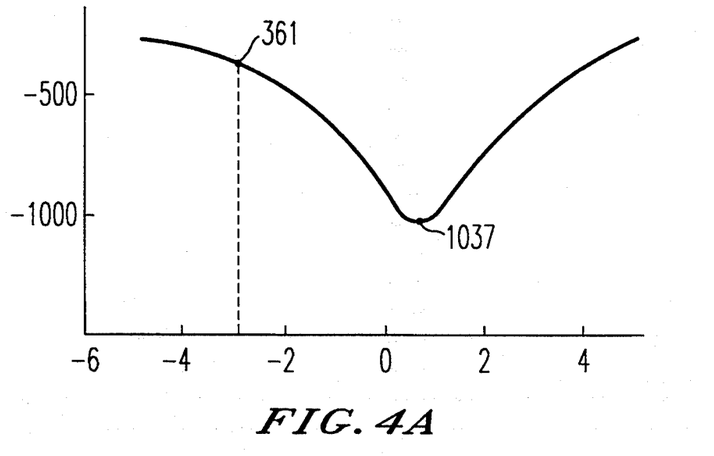
FIG. 4 shows three curves of variations of the field for three heads according to the invention.
Figure 4B:
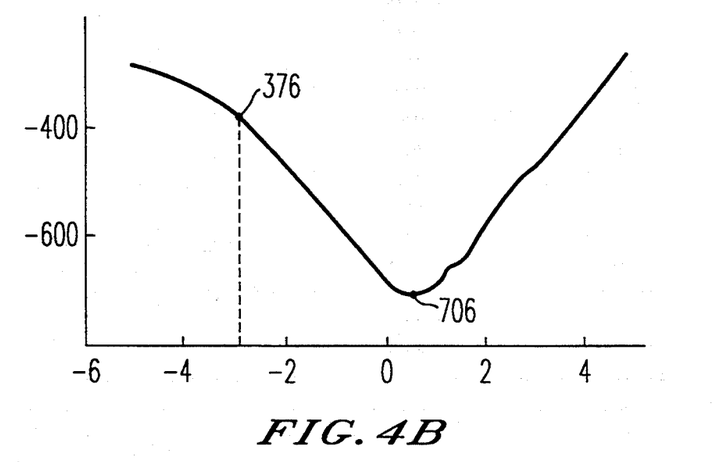
Figure 4C:
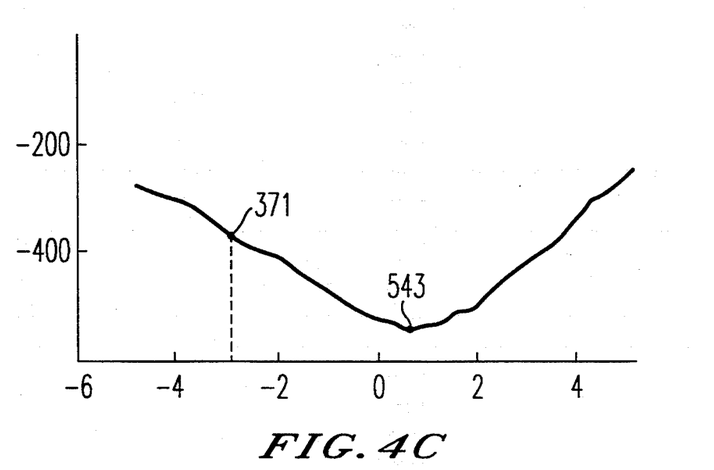

Curves A, D, C of FIG. 4 show three variations of the magnetic field in the longitudinal direction. The units are still arbitrary (but identical with those of FIG. 2 already described) and the distances are expressed in micrometers.

The geometric characteristics of the head (expressed in microns) for these three particular cases were the following, Hp designating the field opposite the pole and Hso the field opposite the optical output assumed to be separated longitudinally 3 μm from the pole;

| Curve A: | Dopt = | 0.3 |
| --- | --- | --- |
| | Dp = | 1 |
| | Dt = | 0.7 |
| | Hp = | 1037 UA |
| | Hso = | 361 UA |
| | R = | 2.8, |
| Curve B: | Dopt = | 0.3 |
| | Dp = | 2 |
| | Dt = | 1.7 |
| | Hp = | 706 UA |
| | Hso = | 376 UA |
| | R = | 1.87, |
| Curve C: | Dopt = | 0.3 |
| | Dp = | 3 |
| | Dt = | 2.7 |
| | Hp = | 543 UA |
| | Hso = | 371 UA |
| | R = | 1.5. |

It is seen that field Hso opposite the optical output exhibits a maximum for curve B, i.E. for Dp=2. In this situation, ratio R of the fields exhibits the value 1.87, much smaller than the value 4 obtained in the prior art. It will therefore be possible to choose a crosswise difference Dt of 1.7 μm between the pole and the optical plane, which will both improve the value of the field under the optical output and reduce the constraint on the ratios of the coercive fields.

The optical subassembly can be obtained as already described in document FR-A-2 606 921 (U.S. Pat. No. -A-4,796,226) already cited. The magnetic pole that is set back can be obtained by any known means. It is sufficient, during the photoetching operation that must outline the polar part, to etch the latter so that the pole is set back relative to the output plane of the optical subassembly.

By way of example, FIGS. 5A to 5J show several stages of a production process able to be used to obtain a head according to the invention. The head is represented in crosswise section and is turned 90° relative to FIG. 3, the recording medium being assumed placed to the right of the head and advancing vertically.

Figure 5A:
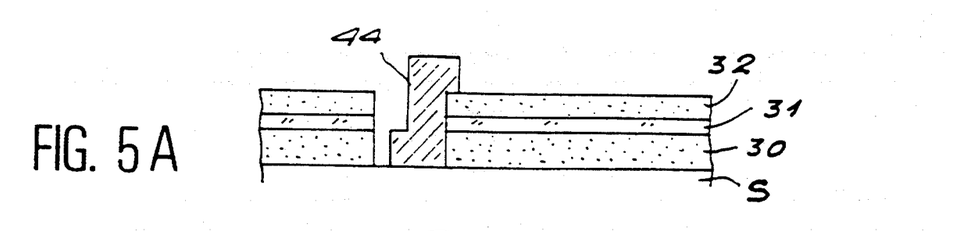
FIGS. 5A, 5B, 5C, 5D, 5E, 5F, 5G, 5H, 5I, 5J show sections illustrating stages for producing a head according to the invention.

The optical subassembly (FIG. 5A) is obtained by stacking of transparent dielectric layers in the wavelengths used. They can be, for example:

a first silicon dioxide layer 30 obtained by thermal oxidation of a silicon substrate, at a temperature on the order of 950° to 1000° C., the thickness being able to be on the order of 2 μm, a second layer 31 of silicon nitride, $Si_3N_4$, deposited chemically in vapor phase, at a temperature on the order of 800° C., the thickness being able to be 0.1 to 0.35 μm, a third layer 32 of silicon dioxide, $SiO_2$, deposited chemically in vapor phase assisted by plasma at a temperature on the order of 350° to 500° C., the thickness being able to be from 2 to several micrometers.

This stage can be considered as a "high temperature" stage relative to the process for producing the magnetic head.

A parabolic metallized mirror 44 (corresponding to mirror MP2 of FIG. 1) is further produced by deposition and etching. The unit obtained is represented in FIG. 5A.

An insulating layer 45, such as a layer of $SiO_2$ of about 5 μm (FIG. 5B), is then deposited on this unit.

Figure 5B:
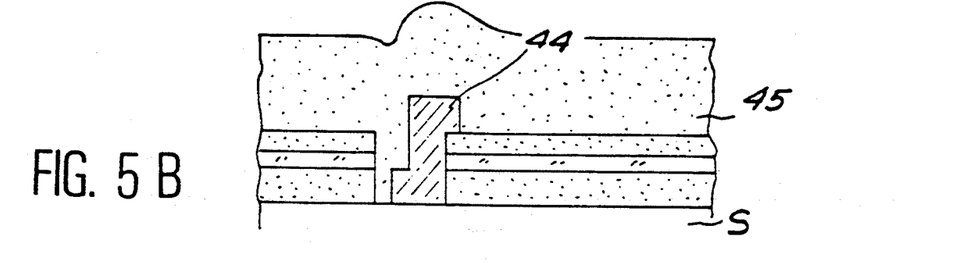
Figure 5C:
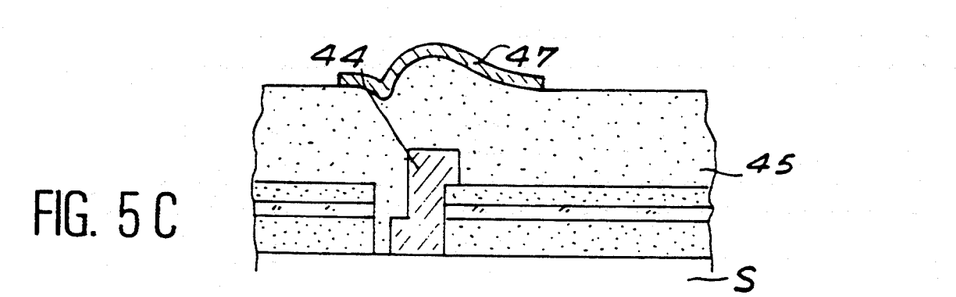

This layer 45 must be planarized and polished. This operation is delicate if there exist recessed patterns relative to the majority plane of the circuit (this is the case of the holes associated with mirrors such as 44). Actually, in this case, it is necessary to remove the majority of the mass of the circuit by polishing to bring it to the lowest level of the circuit.

Figure 5D:
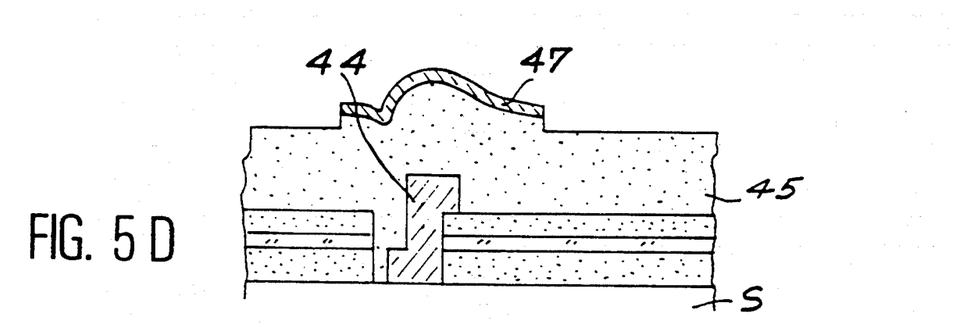

According to the invention, before polishing the upper plane of the circuit, the following steps are performed:

the recessed components (part of layer 45 covering the mirrors (FIG. 5c)) are protected with resin patterns 47;

layer 45 is etched (by dry etching RIE, for example) where it is not protected, with a sufficient thickness so that the majority upper plane is below the patterns (FIG. 5D).

Figure 5E:
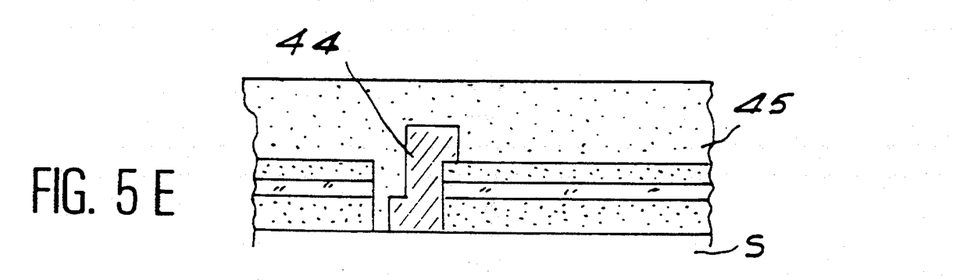

Thus, during the polishing, the minority patterns will abraded to the level of the majority plane, the resin generally being eliminated before polishing (FIG. 5E).

Figure 5F:
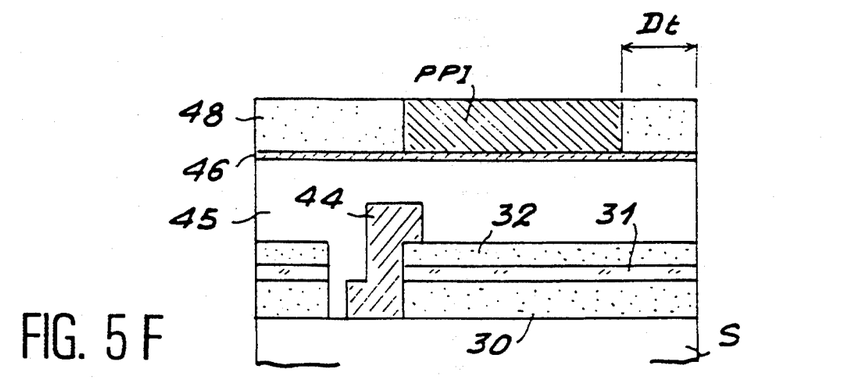

On planarized and polished layer 45, a metal layer 46, for example of gold, then is deposited, then an insulating layer 48, for example of $SiO_2$ is deposited (FIG. 5F).

Figure 6:
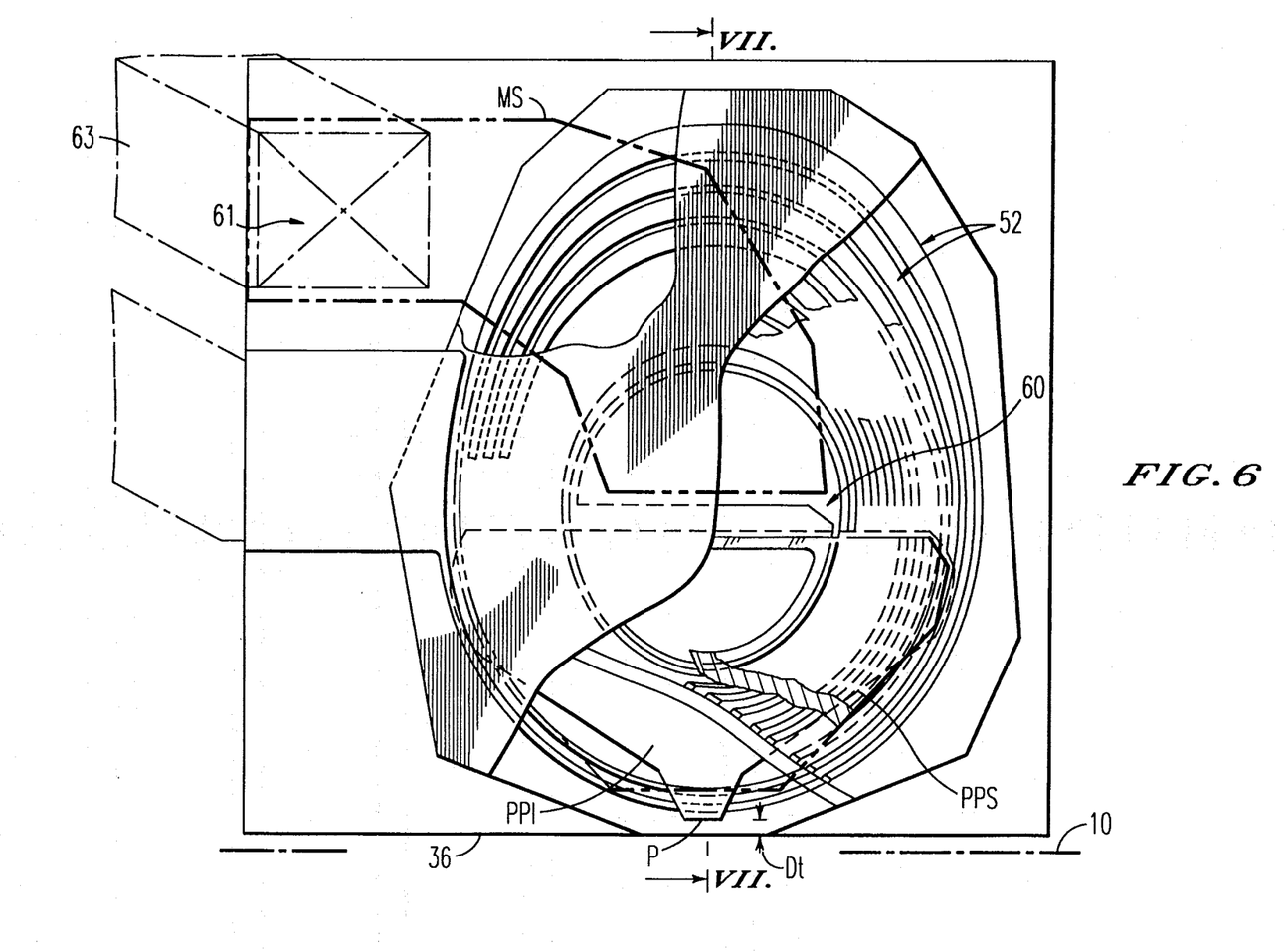
FIG. 6 shows the head according to a view parallel to the plane of the layers.

A lower polar part PPl then is produced which can be, for example, of the alloy FeNi, with a 2 μm thickness, for example, by electrolysis, after having formed, in insulating layer 48, a box by etching according to the pattern represented in FIG. 6. The right edge of the box is set back relative to the edge of the optical subassembly so that the final pole is set back relative to the optical plane. This lower polar part can also be produced by cathode sputtering. In this case, the magnetic material (FeNi) can be deposited in a solid layer, directly on layer 45 (possible elimination of layer 46), then can be etched by photolithography in the pattern of FIG. 6, layer 48 then being deposited then etched after production of lower polar part PPI. In the case of an embodiment of the polar part by etching, this etching is such that the pole is set back relative to the optical plane of the subassembly.

Figure 5G:
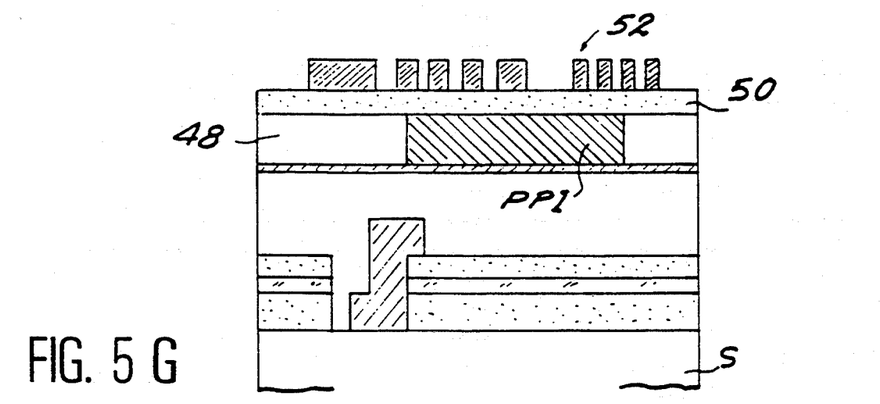

A dielectric layer 50, which can be, for example, of silicon dioxide $SiO_2$, with a thickness of 1 μm, is deposited on the unit obtained (FIG. 5G). A conductive coil 2, for example of copper, then is formed by evaporation of a layer with a thickness of 2 μm, for example, then etching of this layer according to a spiral pattern.

Figure 5H:
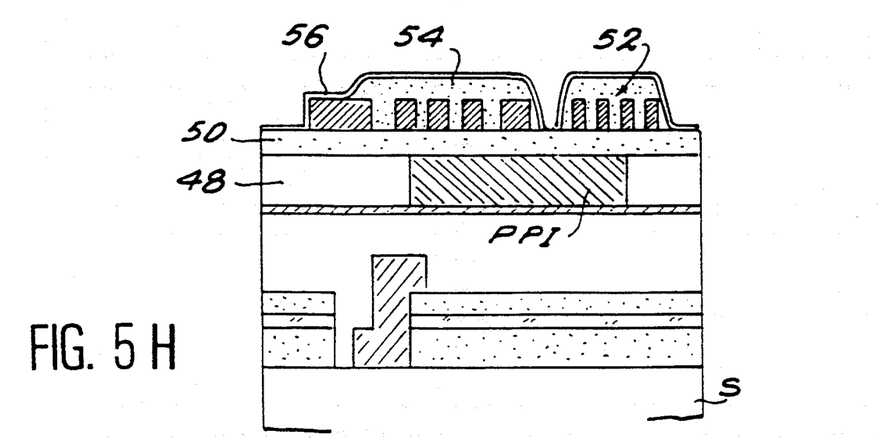
Figure 5I:
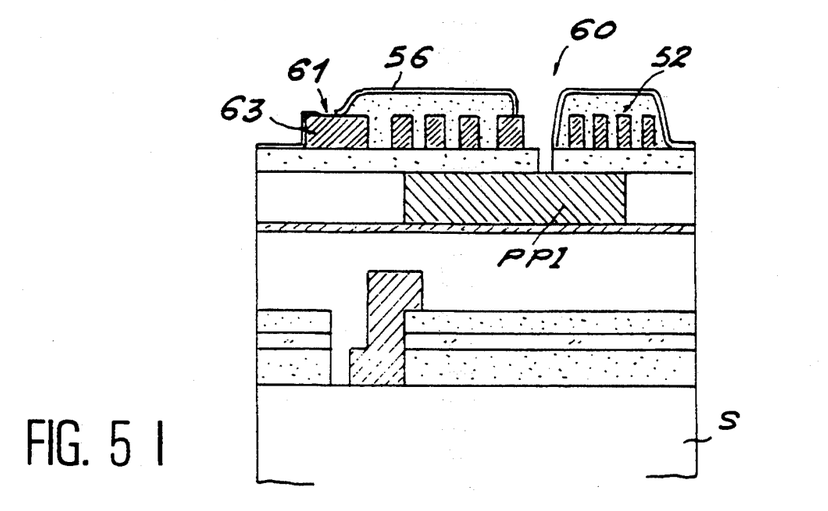
Figure 5J:
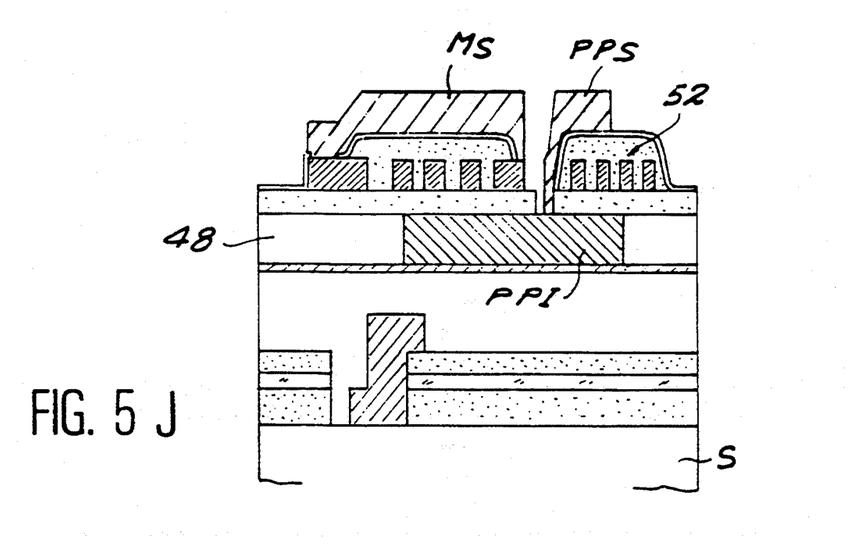

A planarizing insulating layer 54 and optionally an insulating protective layer 56 are then deposited, for example of resin for layer 54 (2 μm, for example) and of evaporated silicon dioxide (0.1 μm, for example) for layer 56 (FIG. 5H).

These layers 56, 54, 50 are etched (FIG. 5I) to form openings (references 60, 61) for the closing of the magnetic circuit of the polar parts and the connection of the electric circuit of the coil. Reference 60 corresponds to a single opening in FIG. 5I, but, of course, to insulate the contact on the coil and the contact on the lower polar part, reference 60 can correspond to two separate openings made in layers 56 and 54.

An upper polar part PPS and an additional pattern MS, for example of FeNi, with a thickness of 1 μm, for example, are then produced (FIG. 5J) according to the patterns which appear in FIG. 6. The embodiment of the upper polar part can be of the same type as that of the lower polar part, i.e., either by electrolysis with use of an additional metal layer, or by cathode sputtering.

It is possible to note in FIG. 6 that additional pattern MS produced at the same level as upper polar part PPS is used as a closing connection of the coil, i.e., before the deposition of the constituent layer of the upper polar part and of pattern MS, holes 60, 61 have been etched in the insulating and protective layers to come out in the copper pins at the center of the coil and on a connection track 63 (63 being a particular pattern of 52). Pattern MS corresponds to a strip which makes it possible to make the electric contact between the center of the coil and the connection track through the contact holes and above the insulating layer. The upper polar part is in contact with or close to the lower polar part by hole 60.

This stacking is performed at a temperature which does not exceed 300° C. Any passage at a higher temperature would run the risk of degrading the properties of this coil. This temperature limit is much lower than the temperatures for producing the optical subassembly. Thus, the magnetic subassembly will be produced on the optical subassembly and not the opposite.

In FIG. 6, the shape of lower polar parts PPI and upper polar parts PPS and the shape of the coil are seen better.

Figure 7:
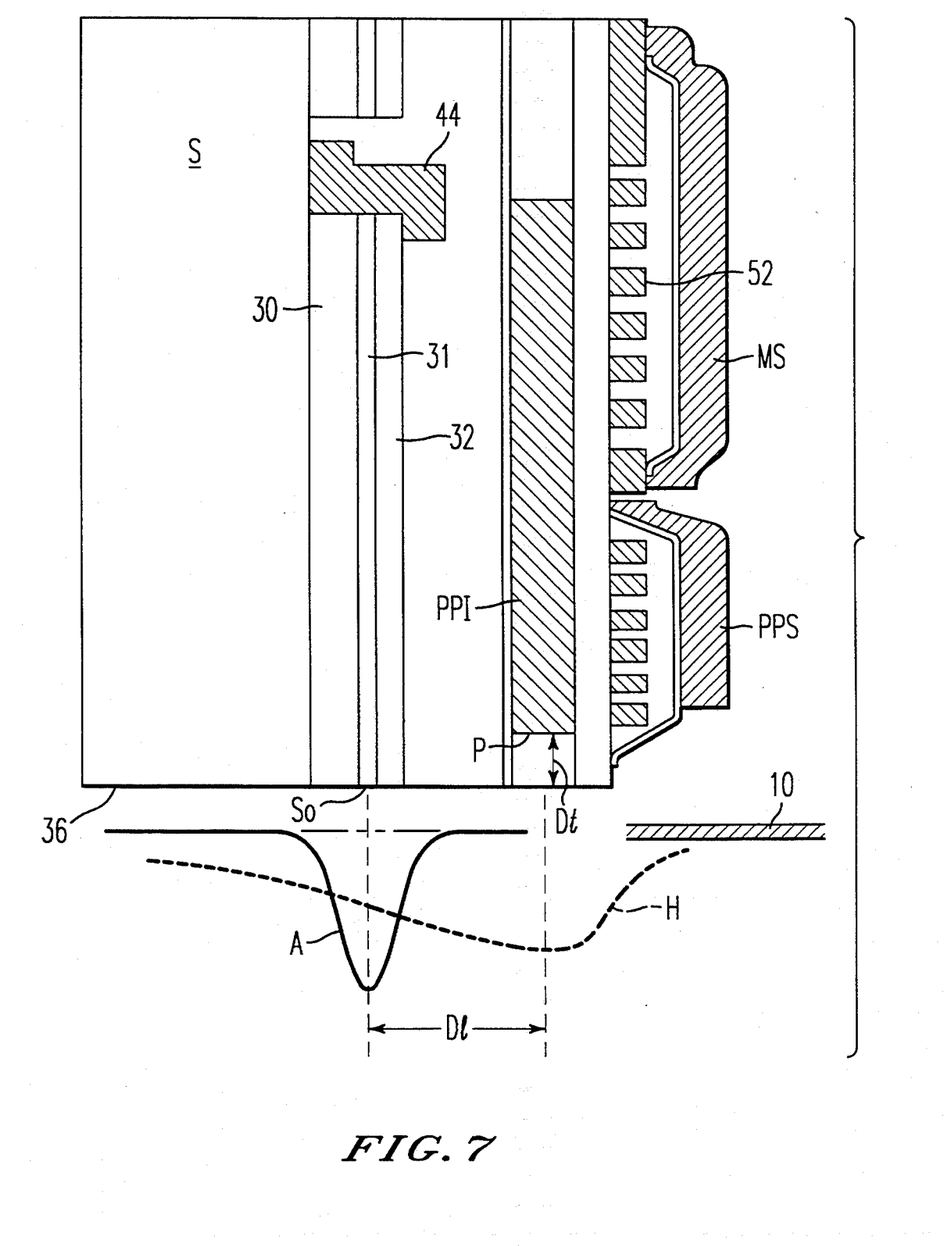
FIG. 7 shows the variation of the magnetic and optical fields opposite a head according to the invention.

FIG. 7 brings together all these elements and clearly shows crosswise offset Dt of pole P relative to optical output SO and the variations of magnetic field H and optical field A at the level of recording medium 10.

The preceding description has been made by asuming that the head was separated from the recording medium (difference Dopt). Of course, this arrangement is not necessary and the invention would apply just as well to contact heads (Dopt=0).

Likewise, the particular structure of the magnetic subassembly with an upper polar part set back from the lower polar part is not at all necessary. It is possible to apply the invention with a magnetic circuit which would contain only a single polar part around which the conductive coil would be wound (an arrangement known as "single pole" or else with "perpendicular recording").

The head of the invention can be used with any magneto-optical medium (disk, tape, etc . . . ), rigid or flexible.

The first optical subassembly which has been described can comprise, in its structure and in its production process, components such as those described in prior patent application Ser. No. 90 04255 filed in the name of the present applicant. Such components comprise cavities filled with a fluid or a polymer having an index of refraction different from the index of refraction of the layer or layers in which they are formed.

The cavities can, in particular, constitute mirrors. Also, such a cavity can be substituted with a mirror (cavity+metal layer) as described by FIGS. 5A to 5E.

We claim:

1. Integrated magneto-optical read and write head on a magnetic recording medium (10), said head comprising two subassemblies integrated on a substrate (S), namely:

A) a first subassembly (SE1), comprising an optical input (EO) able to receive an optical radiation, an optical output (SO) placed in an output plane (36), first optical guide means (30, 31, 32, MP1, MP2) between said input (EO) and said output (SO), a photodetector (D), second optical guide means between said output (SO);

B) a second subassembly (SE2) being fixed to one side of the first subassembly (SE1) and non-movable with respect to said first subassembly (SE1), comprising a magnetic circuit with at least one polar part (PPI) placed in a plane perpendicular to the output plane, said polar part (PPI) exhibiting a magnetic pole (P) turned toward said recording medium (10), an electrically conductive coil (52) formed about an axis substantially perpendicular to the magnetic pole surrounding said magnetic circuit, said head being characterized by the fact that said magnetic pole (P) is set back relative to said optical output plane (36), said optical output (SO) of said first subassembly (SE1) and said magnetic pole (P) of said second subassembly (SE2) thus exhibiting a crosswise offset (Dt); and said crosswise offset (Dt) being a difference between a distance (Dp), defined by a length between the first subassembly to the recording medium and said first distance (Dopt), is in a range between 0.7 and 2.7 micrometers.

2. An integrated magneto-optical head comprising:
an optical subassembly including:
an optical input for receiving optical radiation from an optical radiation source;
optical guide means for refining said optical radiation received by said optical input;
an optical output adjacent said recording medium for directing said optical radiation refined by said optical guide means onto a recording medium, said optical output disposed in an output plane being parallel to said recording medium at a first distance (Dopt) from said recording medium;
a magnetic subassembly fixed to one side of the optical subassembly and non-movable with respect to said optical subassembly including:
a magnetic circuit having a polar part placed in a plane perpendicular to said output plane for forming a magnetic pole directed toward said recording medium, a second distance (Dp) being a distance from an end of said magnetic pole to said recording medium;
an electrically conductive coil surrounding said magnetic circuit and having an axis perpendicular to said magnetic pole;
wherein, said magnetic head is set back relative to the output plane and said second distance (Dp) is greater than said first distance (Dopt); and
whereine, a third distance (Dt) being a difference between said second distance (Dp) and said first distance (Dopt) is in a range between 0.7 to 2.7 micrometers.

3. The integrated magneto-optical read and write head according to claim 1, wherein:

said first subassembly (SE1) is an optical subassembly that directs light from said optical input (EO) to said first optical guide means (MP1) toward both said photodetectors (V) and said second optical guide means (MPT), said second optical guide means (MPT) directs said light toward said optical output (SO).

4. The integrated magneto-optical head according to claim 2, wherein:

said integrated magneto-optical head is a non-contact type head and said first distance (Dopt) is 0.3 micrometers.

* * * * *

UNITED STATES PATENT AND TRADEMARK OFFICE
CERTIFICATE OF CORRECTION

PATENT NO. : 5,440,530
DATED : August 8, 1995
INVENTOR(S) : Jean-Marc FEDELI, et al.

It is certified that error appears in the above-indentified patent and that said Letters Patent is hereby corrected as shown below:

On the title page, Item [75], the third inventor's city of residence should read:

--Champ-Sur-Drac--

Signed and Sealed this

Thirty-first Day of October 1995

*Attest:*

BRUCE LEHMAN

*Attesting Officer*  *Commissioner of Patents and Trademarks*